United States Patent [19]

Matthews et al.

[11] Patent Number: 4,678,068

[45] Date of Patent: Jul. 7, 1987

[54] AUTOMOBILE BRAKE LOCKING SYSTEM

[76] Inventors: Thomas A. Matthews, 4824 Atlantic Ct., Apartment 6, Cape Coral, Fla. 33904; Walter Fischer, P.O. Box 782713, Sandton, Johannesburg, South Africa, 2146; Lucas Petzwinkler, P.O. Box 34248, Erasmie 0023, South Africa

[21] Appl. No.: 766,489

[22] Filed: Aug. 19, 1985

[51] Int. Cl.[4] .................. B60R 25/08; B60T 17/16
[52] U.S. Cl. ........................ 188/353; 303/89
[58] Field of Search ............. 303/89; 188/353, 265, 188/151 A; 137/384.2, 384.6, 384.8, 598; 251/254, 258; 192/4 A; 70/253

[56] References Cited

U.S. PATENT DOCUMENTS

| | | | |
|---|---|---|---|
| 2,732,859 | 1/1956 | Chace | 251/254 X |
| 2,964,141 | 12/1960 | Schlumbrecht | 188/353 |
| 3,617,100 | 11/1971 | Wrigley et al. | 188/353 X |
| 3,617,663 | 11/1971 | Whittemore | 188/353 X |
| 3,653,730 | 4/1972 | Cvetkovich | 188/353 X |
| 4,010,984 | 3/1977 | Coleman | 303/89 |
| 4,018,314 | 4/1977 | Richmond et al. | 303/89 X |

Primary Examiner—Douglas C. Butler
Attorney, Agent, or Firm—Alfred E. Wilson

[57] ABSTRACT

Automobile theft is running rampant throughout the country, and many automobile stealing organizations are well organized, and have the necessary techniques to enable them to select and steal virtually any automobile. In a matter of a few hours they can change numbers, and other identifying data and give the automobile a new identity and appearance so that the automobile can be quickly sold at somewhat reduced prices. The overall profits are indeed very substantial. We have devised a theft proof locking system, including a key operated unit, which can be positioned at any desired location in the vehicle, and is operable to fully apply the brakes to all four wheels of the vehicle. This renders the vehicle immobile, even though the engine can be started and run. The only way that this locking system can be rendered inoperable is by the act of unlocking it with the key. It is therefore impossible to move the vehicle without lifting it bodily to load it onto a trailer or transport.

1 Claim, 10 Drawing Figures

U.S. Patent Jul. 7, 1987 Sheet 2 of 2 4,678,068
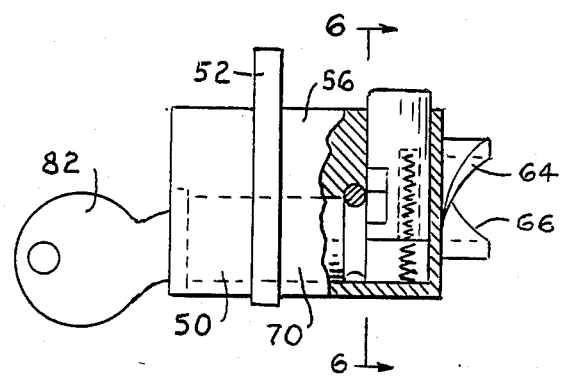
Fig.-5
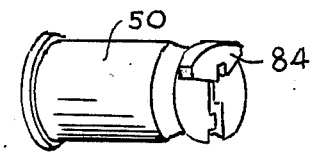
Fig.-8
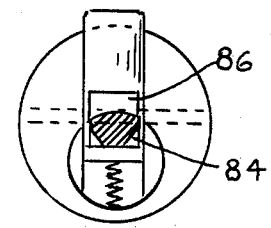
Fig.-6
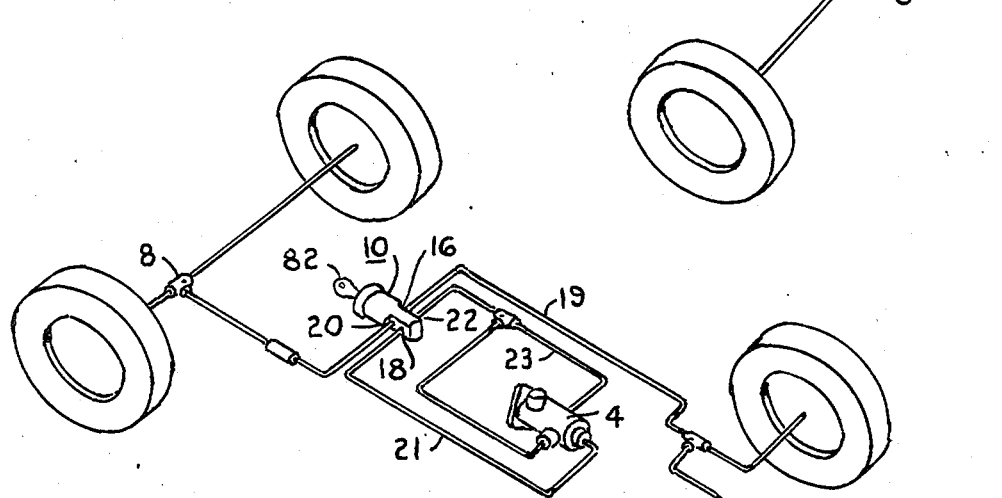
Fig.-9
Fig.-10

AUTOMOBILE BRAKE LOCKING SYSTEM

BACKGROUND OF THE INVENTION

Many efforts have been directed to devising a readily operable control system, preferably one that would be operated by a key, to render the vehicle immobile, even though it is possible to start and operate the engine. These efforts have not been successful to the extent that such devices have been adopted and installed commercially in production built vehicles.

DESCRIPTION OF THE PRIOR ART

The efforts that have been made to devise an effective locking system for vehicles have not been successful in preventing automobiles from being stolen. Some of those systems include a locking of the hand operated emergency braking system. That system has not been effective because the locked end of the vehicle, generally the rear wheels, can be picked up by a wrecker, and the vehicle can be hauled away.

SUMMARY OF THE INVENTION

We have been successful in devising a key operated vehicle control system which can be located anywhere in the vehicle to lock all four wheels of the vehicle when the control is actuated. The control is connected between the master cylinder and the wheel cylinders of the braking system and it is effective to prevent the vehicle from being moved until the control is unlocked.

BRIEF DESCRIPTION OF THE DRAWINGS

Referring to the drawings wherein similar reference characters refer to similar parts throughout the several views:

FIG. 5 is a side elevational view of the key operated locking control mechanism and cam actuator.

FIG. 6 is a sectional view taken on the line 6—6 of FIG. 5 looking in the direction of the arrows.

FIG. 8 is a perspective view of the key actuated control mechanism.

FIG. 9 is a perspective view of a single circuit hydraulic brake locking system as embodied in a vehicle.

FIG. 10 is a view similar to FIG. 9 illustrating a modified form of the invention wherein a dual circuit brake system is illustrated.

DESCRIPTION OF THE PREFERRED EMBODIMENT

Figure 1:
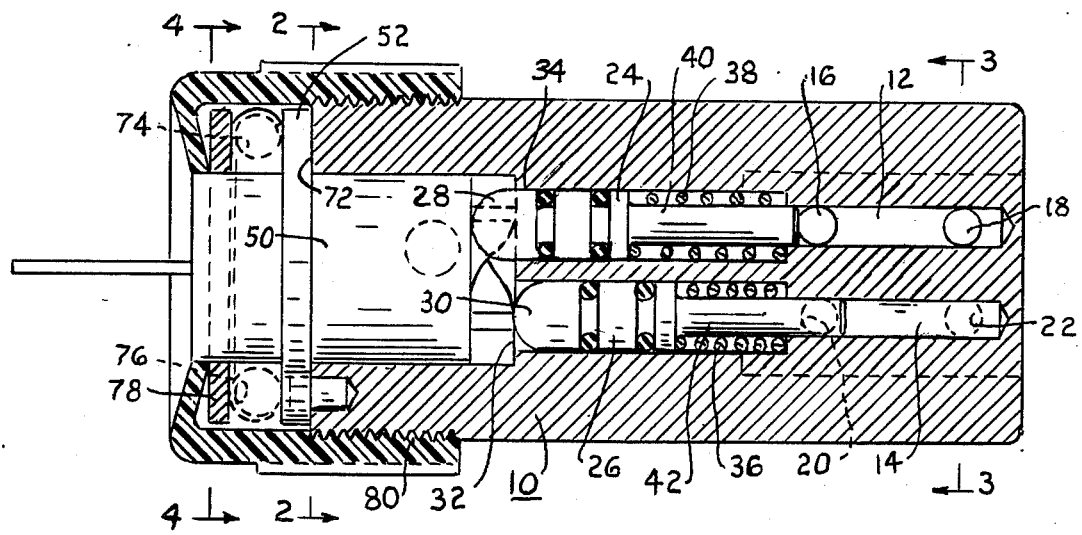
FIG. 1 is a longitudinal sectional view of the main control system showing each of the key actuated plungers in the different position they occupy.
Figure 2:
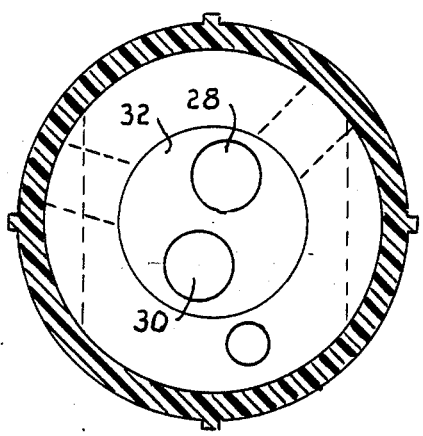
FIG. 2 is a sectional view taken on the line 2—2 of FIG. 1 looking in the direction of the arrows.
Figure 3:
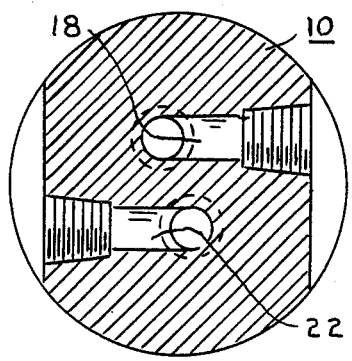
FIG. 3 is a sectional view taken on the line 3—3 of FIG. 1 looking in the direction of the arrows.
Figure 4:
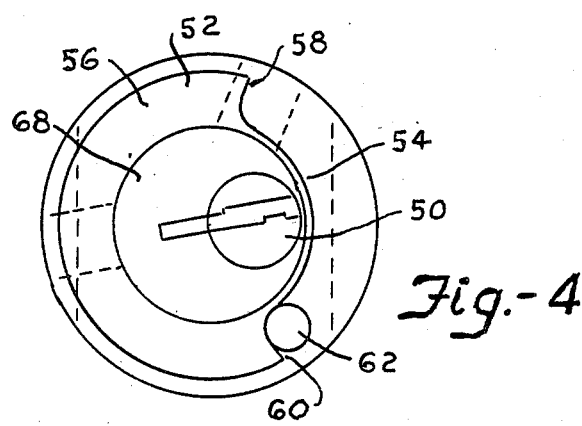
FIG. 4 is a sectional view taken on the line 4—4 of FIG. 1 looking in the direction of the arrows.

In the operation of our key operated brake locking system for automobiles and other ground traversing vehicles, a main control system is interposed between the master cylinder 4 and the front and rear wheel cylinders shown schematically at 6 and 8 of the vehicle braking system. The main control system includes a cylindrical barrel 10 which may be located at any desired location in the vehicle so long as it is interconnected by hydraulic liquid flow pipes between the master cylinder 4 and the wheel cylinders 6 and 8 of the vehicle. It is therefore possible to hide the control to some degree so that anyone attempting to steal a vehicle they had not previously monitored would have difficulties locating the master control 10.

The cylindrical barrel 10 has two parallel longitudinally extending cylinders 12 and 14 which act in unison. The cylinder 12 has apertures 16 and 18 spaced longitudinally in the cylinder 12, and the cylinder 14 has apertures 20 and 22 spaced longitudinally in the cylinder 14. The front apertures 16 and 20 in the cylinders 12 and 14 are connected by pipes 17 and 19 with the front and rear wheel braking cylinders shown schematically at 6 and 8 of the vehicle and illustrated in FIGS. 9 and 10. The rear apertures 18 and 22 in the cylinders 12 and 14 are connected by pipes 21 and 23 with the master cylinder 4 as illustrated.

Spaced plungers 24 and 26 having rounded outer ends 28 and 30 are slidably mounted in cylinders 32 and 34 concentrically disposed relative to the cylinders 12 and 14 and are of somewhat larger diameters than the cylinders 12 and 14. The plungers 24 and 26 are yieldingly urged to the left as viewed in FIG. 1 by springs 36 and 38. The plungers 24 and 26 have cylindrical projections 40 and 42 adapted to project into the cylinders 12 and 14 and to block off the apertures 16 and 20 in the cylinders 12 and 14 when the plungers 24 and 26 are in the depressed position illustrated by the position of the plunger 26 in the cylinder 34 which moves the plunger 42 to close the aperture 20 as shown in FIG. 1. Thus when the plungers 40 and 42 which act in unison are in the extended position the apertures 16 and 20 are blocked, and the brake applying fluid in the hydraulic sysem is trapped in the wheel cylinders 6 and 8 to permanently set and hold the brakes applied until the plungers 24 and 26 are released to permit the springs 36 and 38 to shift the plungers 24 and 26 to withdraw the cylindrical extensions 40 and 42 toward the left as shown in FIG. 1 to the retracted position to uncover the apertures 16 and 20 to permit the hydraulic braking fluid to flow back from the cylinders 12 and 14 and from the wheel cylinders 6 and 8 to the master cylinder 4 to release the front and rear brakes.

The plungers 24 and 26 which prevent the release of the brakes when the projections 40 and 42 cover the apertures 16 and 20 of the cylinders 12 and 14 are actuated by the key operated locking mechanism 50 illustrated in FIGS. 4 to 8. Preferably the locking mechanism has what is recognized as being a good lock, such for example as a six tumbler type lock.

The locking mechanism 50 controls the rotational movement of a control 52 having a cut-out rim segment 54 to permit rotational movement of the mechanism 56 in opposite directions from a stop pin 62 which engages opposite ends of the cut-out rim portion 54. This establishes the low and the high range positions of the cam 88.

Figure 7:
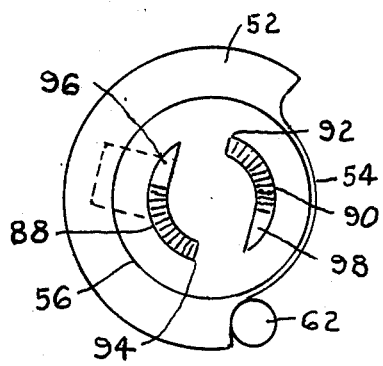
FIG. 7 is an end elevational view taken on the line 7—7 of FIG. 5 looking in the direction of the arrows.

Actuation of the key 82 induces the cam surfaces 88 and 90 illustrated in FIG. 7 to rotate relative to the rounded ends 28 and 30 of the plungers 24 and 26 to shift the cylindrical extensions 40 and 42 to open the apertures 16 and 20 in the longitudinal cylinders 12 and 14 to release the brakes at the wheel cylinders 6 and 8 when the low ends 92 and 94 of the cam surfaces 88 and 90 engage the rounded ends 28 and 30 of the plungers 24 and 26. When the key 82 is actuated to lock the brakes of the vehicle, the rounded ends 28 and 30 of the plungers 24 and 26 are shifted longitudinally inwardly by the cam surfaces 88 and 90, and when the high ends 96 and 98 of the cams 88 and 90 engage the rounded ends 28 and 30 of the plungers 24 and 26 the apertures 16 and 20 in the cylinders 12 and 14 are closed to prevent the hydraulic brake actuating liquid from escaping from the wheel cylinders 6 and 8 whereupon the brakes are locked and it is then impossible to move the vehicle unless it is picked up bodily and placed on a transport.

We claim:

1. In a vehicle having front and rear wheels, hydraulically operated brake cylinders at said front and rear wheels, a foot-operated pedal to apply said front and rear brake cylinders by a tandem master cylinder situated between the foot-operated pedal and the brake cylinders, the master cylinder including separate outlet ports, a key-operated control mechanism including a key, the mechanism being separate from said master cylinder, the mechanism further being interposed between the master cylinder and said front and rear brake cylinders, said mechanism including a cylindrical barrel with two parallel compound diametered cylinders each having smaller and larger longitudinally extending bores, longitudinally spaced front and rear apertures or ports in each of said smaller bores, compound plunger assemblies with each assembly including a rounded end, an intermediate plunger and a plunger projection of smaller diameter than the respective plunger, the assemblies slidably mounted in said two diametered cylinders, an hydraulic fluid conduit interconnecting one of said front ports with said front brake cylinders and an hydraulic conduit interconnecting the other front port with said rear brake cylinders, separate hydraulic fluid conduits interconnecting the rear ports separately with said master cylinder outlet ports, each of said smaller-diametered plunger projections each being operable in one position by operation of the key-operated control mechanism to cause longitudinal movement of the plungers and associated projections to overlie and close the front ports and operable in the key-operated mechanism's inoperative position to open the front ports, a separate coil spring surrounding each of the smaller diametered plunger projections and operable to urge the plunger projections to move to uncover the front ports in the smaller diametered bores in said inoperative position to provide open fluid communication between the front and rear ports, the rounded ends of each plunger assembly being integral with the said intermediate plungers with the rounded ends projecting beyond the larger diametered bores toward key operated cam members of said mechanism to engage the rounded ends of the larger diametered plungers to longitudinally move the smaller diametered plunger projections to close the front ports of the smaller diametered bores to trap fluid in the front and rear brake cylinders to lock the vehicle wheels against rotation, the locking mechanism being of the double-acting cam type, rotation of the key inducing cam surfaces of the double-acting cam to rotate relative to the rounded ends of said plungers to cause the shifting of said plunger assemblies by direct engagement between the cam surfaces and rounded ends of the respective plunger assembly.

* * * * *